US008787162B2

(12) United States Patent
Forsberg et al.

(10) Patent No.: US 8,787,162 B2
(45) Date of Patent: Jul. 22, 2014

(54) OUTGOING COMMUNICATION BARRING SERVICE IN THE IP MULTIMEDIA SUBSYSTEM

(75) Inventors: Mikael Forsberg, Tyreso (SE); Laszlo Balla, Pomaz (HU); Hans Andersson, Enskede (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 166 days.

(21) Appl. No.: 13/473,797

(22) Filed: May 17, 2012

(65) Prior Publication Data

US 2012/0300677 A1 Nov. 29, 2012

Related U.S. Application Data

(60) Provisional application No. 61/490,882, filed on May 27, 2011.

(30) Foreign Application Priority Data

May 23, 2011 (EP) .................................... 11167177

(51) Int. Cl.
H04L 12/26 (2006.01)
(52) U.S. Cl.
USPC ............ 370/230; 709/201; 455/518; 455/519
(58) Field of Classification Search
CPC ....... H04L 47/10; H04L 5/0053; H04L 47/15; H04L 47/2441; H04L 47/70; H04L 29/06414; H04L 12/42; H04L 65/00; H04L 45/00; H04L 45/02; H04L 45/04; H04M 3/561; H04M 3/567
USPC ......... 370/351, 352, 230, 236, 353, 261, 260; 455/518, 519, 90.2, 412.2, 550.1, 455/426.1, 412.1, 414.1, 458; 709/231, 709/227, 201
See application file for complete search history.

(56) References Cited

U.S. PATENT DOCUMENTS

2011/0070917 A1* 3/2011 Sung et al. ..................... 455/518

FOREIGN PATENT DOCUMENTS

EP 2 528 294 B1 12/2013

OTHER PUBLICATIONS

3rd Generation Partnership Project; Technical Specification Group Core Network and Terminals; Conference using the IP Multimedia (IM) Core Network (CN) subsystem; Stage 3 (Release 10); 3GPP TS 24.147, V10.0.0, Dec. 2010, 208 Pages.

(Continued)

Primary Examiner — Dady Chery
(74) Attorney, Agent, or Firm — Myers Bigel Sibley & Sajovec, P.A.

(57) ABSTRACT

A user terminal may include an IP Multimedia Subsystem, IMS, client to enable the terminal to communicate with an IMS network. The IMS client may include a conference creation and control unit configured to create and control an IMS conference involving one or more participants, participants being identified within a conference INVITE or REFER message by respective Uniform Resource Identifiers, URIs, within a URI list. The conference creation and control unit may include a response handling unit configured to receive from the IMS network, in response to the sending of an INVITE or REFER, a SIP response message including an XML body specifying an Outgoing Communication Barring, OCB, service invocation result and configured to present the specified result to a terminal user. Related methods and application servers are also discussed.

12 Claims, 8 Drawing Sheets

(56) References Cited

OTHER PUBLICATIONS

Digital cellular telecommunications system (Phase 2+); Universal Mobile Telecommunications System (UMTS); LTE; Common Basic Communication procedures using IP Multimedia (IM) Core Network (CN) subsystem; Protocol specification (3GPP TS 24.628 version 10.2.0 Release 10); ETSI TS 124 628 v10.2.20, Apr. 2011, 59 Pages.
Digital cellular telecommunications system (Phase 2+); Universal Mobile Telecommunications System (UMTS); LTE; Anonymous Communication Rejection (ACR) and Communication Barring (CB) using IP Multimedia Core Network (CN) subsystem; Protocol specification (3GPP TS 24.611 version 10.0.0 Release 10); ETSI TS 124 611 v10.0.0 (Mar. 2011), 24 Pages.
European Communication Corresponding to European Application No. 11167177.2; Dated: Sep. 15, 2011; 8 Pages.
Rosenberg, J., "Extensible Markup Language (XML) Formats for Representing Resource Lists", *Cisco*, May 2007, 29 Pages.
3$^{rd}$ Generation Partnership Project; Technical Specification Group Core Network and Terminals; Anonymous Communication Rejection (ACR) and Communication Barring (CB) Using IP Multimedia (IM) Core Network (CN) Subsystem; Protocol Specification (Release 9); 3GPP TS 24.611, V9.3.0, Mar. 2010, 22 Pages.

\* cited by examiner

OUTGOING COMMUNICATION BARRING SERVICE IN THE IP MULTIMEDIA SUBSYSTEM

RELATED APPLICATIONS

The present application claims the benefit of priority from U.S. Provisional Application No. 61/490,882 filed May 27, 2011, and from European Application No. 11167177.2 filed May 23, 2011. The disclosures of both of the above referenced applications are hereby incorporated herein in their entireties by reference.

FIELD OF THE INVENTION

This invention relates to the Outgoing Communication Barring service available within an IP Multimedia Subsystem. More particularly, the invention relates to the handling of the Outgoing Communication Barring service in the case of conference calls.

BACKGROUND TO THE INVENTION

IP (Internet Protocol) Multimedia services provide a dynamic combination of voice, video, messaging, data, etc. within the same session. By growing the number of basic applications and the media which it is possible to combine, the number of services offered to the end users will grow, and the inter-personal communication experience will be enriched. This will lead to a new generation of personalised, rich multimedia communication services, including so-called "combinational IP Multimedia" services.

The Universal Mobile Telecommunications System (UMTS) is a third generation wireless system designed to provide higher data rates and enhanced services to users. The UMTS architecture includes a subsystem known as the IP Multimedia Subsystem (IMS) for supporting traditional telephony as well as new IP multimedia services. IMS provides key features to enrich the end-user person-to-person communication experience through the use of standardised IMS Service Enablers, which facilitate new rich person-to-person (client-to-client) communication services as well as person-to-content (client-to-server) services over IP-based networks. The IMS is able to connect to both PSTN/ISDN (Public Switched Telephone Network/Integrated Services Digital Network) as well as the Internet. 3GPP IMS Release 8 provides support for Long Term Evolution (LTE), System Architecture Evolution (SAE).

The IMS makes use of the Session Initiation Protocol (SIP) to set up and control calls or sessions between user terminals (or terminals and application servers). The Session Description Protocol (SDP), carried by SIP signalling, is used to describe and negotiate the media components of the session. Whilst SIP was created as a user-to-user protocol, IMS allows operators and service providers to control user access to services and to charge users accordingly. The 3GPP has chosen SIP for signalling between a User Equipment (UE) and the IMS as well as between the components within the IMS.

By way of example, FIG. 1 illustrates schematically how the IMS fits into the mobile network architecture in the case of a GPRS/PS (General Packet Radio Services, Packet Switched) access network (IMS can of course operate over other access networks). Call/Session Control Functions (CSCFs) operate as SIP proxies within the IMS. The 3GPP architecture defines three types of CSCFs: the Proxy CSCF (P-CSCF) which is the first point of contact within the IMS for a SIP terminal; the Serving CSCF (S-CSCF) which provides services to the user that the user is subscribed to; and the Interrogating CSCF (I-CSCF) whose role is to identify the correct S-CSCF and to forward to that S-CSCF a request received from a SIP terminal via a P-CSCF.

Within the IMS service network, Application Servers (ASs) are provided for implementing IMS service functionality. Application Servers provide services to end users in an IMS system, and may be connected either as end-points over the 3GPP ($3^{rd}$ Generation Partnership Project) defined Mr interface, or "linked in" by an S-CSCF over the 3GPP defined ISC interface. In the latter case, Initial Filter Criteria (IFC) are used by an S-CSCF to determine which Applications Servers should be "linked in" during a SIP Session establishment (or indeed for the purpose of any SIP method, session or non-session related). The IFCs are received by the S-CSCF from an HSS during the IMS registration procedure as part of a user's Subscriber Profile.

The 3GPP specification TS 24.147 entitled "Conferencing using the IP Multimedia (IM) Core Network (CN) subsystem" specifies (in chapter 5.3.1.5.4) how an IMS user can initiate a conference call by sending a SIP INVITE to the IMS network, with the INVITE identifying the peer conference participants by way of a URI list. Each entry in the list will typically be a SIP or Tel URI of another IMS user. RFC 5368 further specifies how the SIP REFER method can be used to add participants to an established conference.

FIG. 2 illustrates signalling associated with establishing a 3-way conference call (involving an originating participant A and invited participants B and C) according to TS 24.147. In this example, the initiating INVITE includes a URI list containing the SIP URIs of B and C. The signalling flow transits Multimedia Telephony Application Servers (MTASs) associated with each of the IMS users A, B and C. In addition, the signalling transits a MTAS conference server which acts both as a conference factory and as a focus. [The conference factory and focus may be allocated on the originating or terminating side AS. Both of these scenarios utilise a Public Service Identity (PSI as specified in TS 24.147.] A Mixer Media Resource Function Controller (MRFC) is notified of the inclusion of the participants in the conference and is responsible for ordering mixing media in the user plane using a Media Resource Function Processor (MRFP).

OCB (Outgoing Communication Barring) is described in the 3GPP TS 24.611 specification and is a service that can be implemented by or on behalf of IMS users to prohibit outgoing calls to particular users or to classes of users. By way of example, OCB may be used to prevent a user calling abroad. In the case of a normal, two party peer-to-peer call, if an OCB service implemented on behalf of the call initiator determines that the call should be blocked, the OCB AS will send a SIP 603 Decline response to the call initiator. Additionally, before terminating the communication the OCB AS can provide an announcement to the call initiator. The procedure to invoke an announcement is described within 3GPP TS 24.628

In chapter 4.6.6, TS 24.611 deals with the application of OCB to conference calls, stating in particular that:

"If the conference creator activated the OCB service then, the AS providing the CB service shall remove the URI that is barred by the conference creator's Outgoing Communication Barring (OCB) rules from the list of URIs in the "recipient-list" body of INVITE request."

Following the removal of the barred URI(s) from the INVITE, the request is forwarded to the conference server.

As it stands, the current OCB proposals may result in peer users being excluded from the invitation list for a conference call without the conference initiator being given any indication either that those peer users have been excluded or the reason for their exclusion. The AS providing the OCB service for the originating user is not required to send any information backwards to the conference creator, and in particular will not return a 603 Decline message. Whilst it is possible for the conference creator to subscribe for conference events by sending a SUBSCRIBE to the conference focus, see TS 24.147/RFC 4575, it will be appreciated that the conference server will have no knowledge of the removed URIs as this removal is carried out by the OCB AS in advance of the INVITE being received by the conference server.

SUMMARY

It is an object of the present invention to provide a mechanism that allows an IMS conference creator to be notified when an Outgoing Communication Barring (OCB) service impacts on the conference being created.

According to a first aspect of the present invention there is provided a user terminal comprising an IP Multimedia Subsystem, IMS, client for enabling the terminal to communicate with an IMS network. The IMS client comprises a conference creation and control unit for creating and controlling an IMS conference involving one or more participants, participants being identified within a conference INVITE or REFER message by respective Uniform Resource Identifiers, URIs, within a URI list, the conference creation and control unit comprising a response handling unit for receiving from said IMS network, in response to the sending of an INVITE or REFER, a SIP response message including an XML (Extensible Markup Language) body specifying an Outgoing Communication Barring, OCB, service invocation result and for presenting the specified result to a terminal user.

Embodiments of the present invention provide an efficient mechanism for notifying the conference creator of an OCB service result and in particular of a result which means that one or more invitees are rejected. This is likely to result in increased user satisfaction and unexplained rejections will likely result in user confusion and frustration.

The response handling unit may be configured to identify within a received response message a Session Description Protocol, SDP, part identifying an audio announcement to be played on the terminal, and to cause said audio announcement to be played.

According to a second aspect of the present invention there is provided apparatus configured to operate as an Application Server within an IP Multimedia Subsystem, IMS, network. The apparatus comprises an Outgoing Communication Barring, OCB, service unit for invoking an OCB service in respect of subscribed IMS users, the OCB service unit being configured to receive an INVITE or REFER message relating to the establishment or control of a conference call, the INVITE or REFER message identifying one or more participants by way of Uniform Resource Identifiers, URIs, within a URI list, to determine an OCB service invocation result for the URI list, and to construct and send to the conference creator a SIP response message including an XML body specifying said OCB service invocation result.

The OCB service unit may be configured to include within said SIP response message a Session Description Protocol, SDP, part specifying an audio announcement to be played to the conference creator. The OCB service unit may be configured to inform a Media Resource Function Controller, MRFC, of the IMS network of the URI of any participant barred from the conference as a result of said OCB service invocation for the purpose of allowing the MRFC to construct an audio announcement.

According to a third aspect of the present invention there is provided a method of handling an INVITE or REFER message at an Application server implementing an Outgoing Communication Barring, OCB, service for an IMS user. The method comprises receiving an INVITE or REFER message in respect of a conference call, the message identifying one or more participants by way of Uniform Resource Identifiers, URIs, within a URI list, invoking an OCB service for the conference creator and applying the service to the INVITE or REFER message to determine an OCB service invocation result for the URI list, and constructing and sending to the conference creator a SIP response message including an XML body specifying said OCB service invocation result.

DETAILED DESCRIPTION

The invention will now be described more fully hereinafter with reference to the accompanying drawings, in which examples of embodiments of the invention are shown. This invention may, however, be embodied in many different forms and should not be construed as limited to the embodiments set forth herein. Rather, these embodiments are provided so that this disclosure will be thorough and complete, and will fully convey the scope of the present invention to those skilled in the art. It should also be noted that these embodiments are not mutually exclusive. Components from one embodiment may be tacitly assumed to be present/used in another embodiment.

As has been discussed above, the existing IMS Outgoing Communication Barring (OCB) service can be applied by an Application Server to remove users from a URI list contained in a conference initiating INVITE. However, the existing approach does not provide a mechanism for notifying the conference creator of the removal of a user from the INVITE URI list by the OCB service and of the reason for the removal.

It is proposed here to include this information in a provisional or final response SIP message sent by the AS (implementing the OCB service) to the conference creator, and optionally by including the information in an announcement played to the conference creator.

Figure 1:
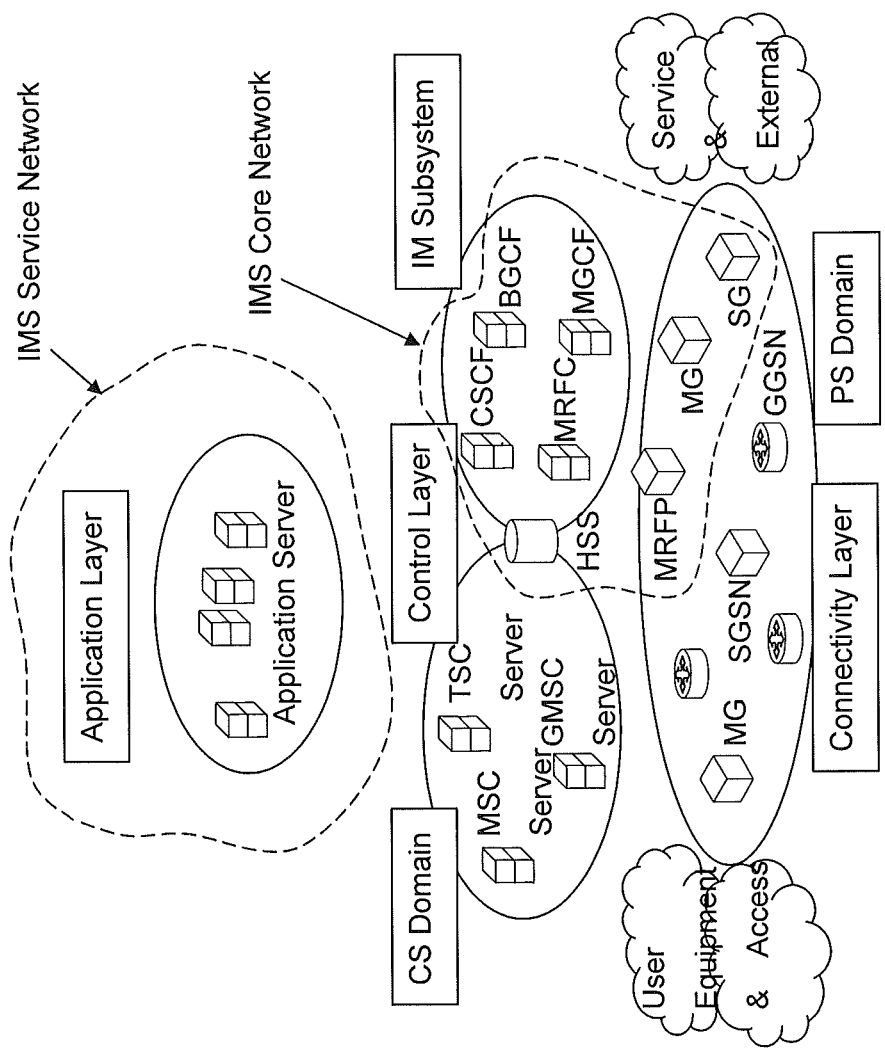
FIG. 1 illustrates schematically an IP Multimedia Subsystem core and service networks integrated into a 3G UMTS network.
Figure 2:
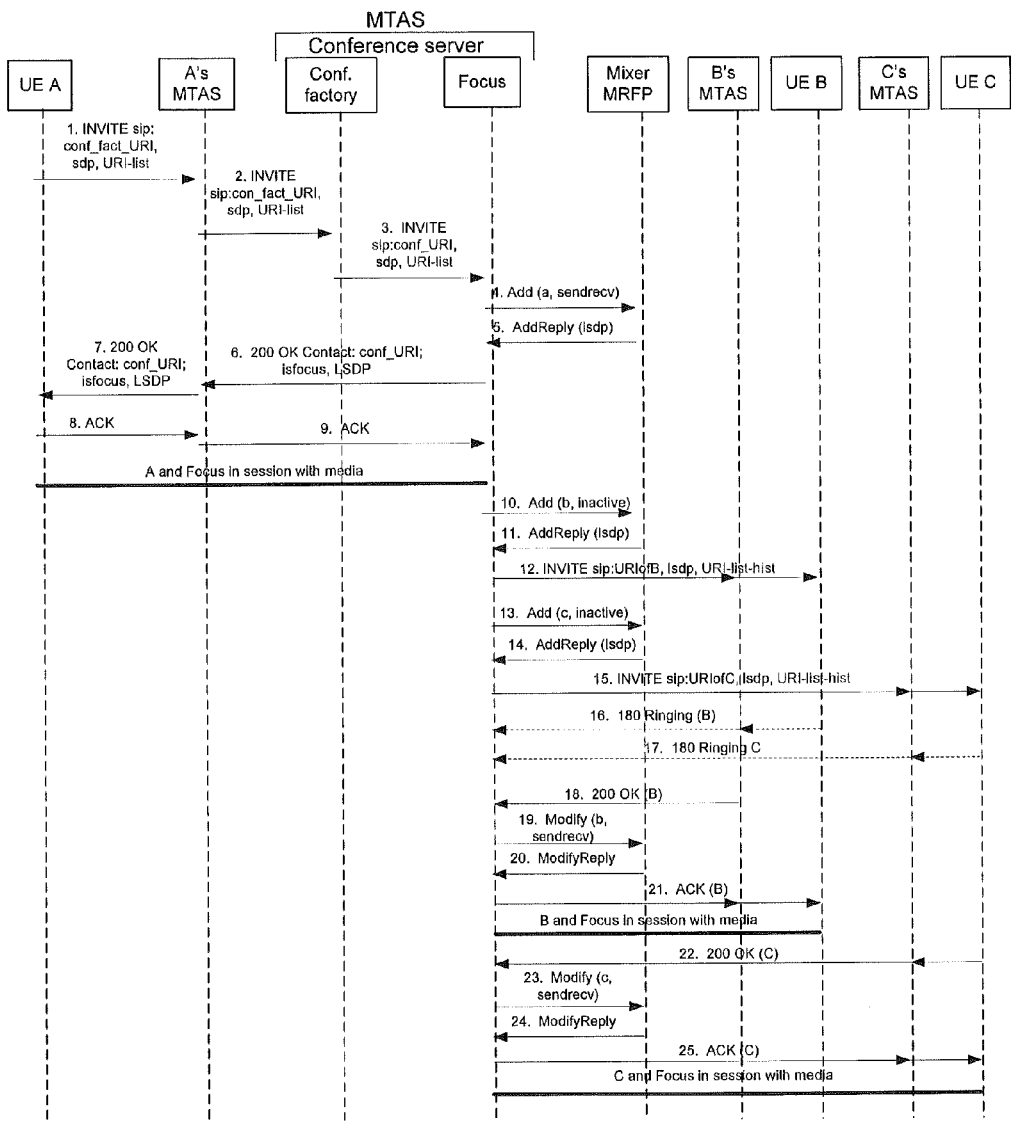
FIG. 2 illustrates a signalling flow associated with the creation of an IMS conference involving three parties, A, B and C.
Figure 3:
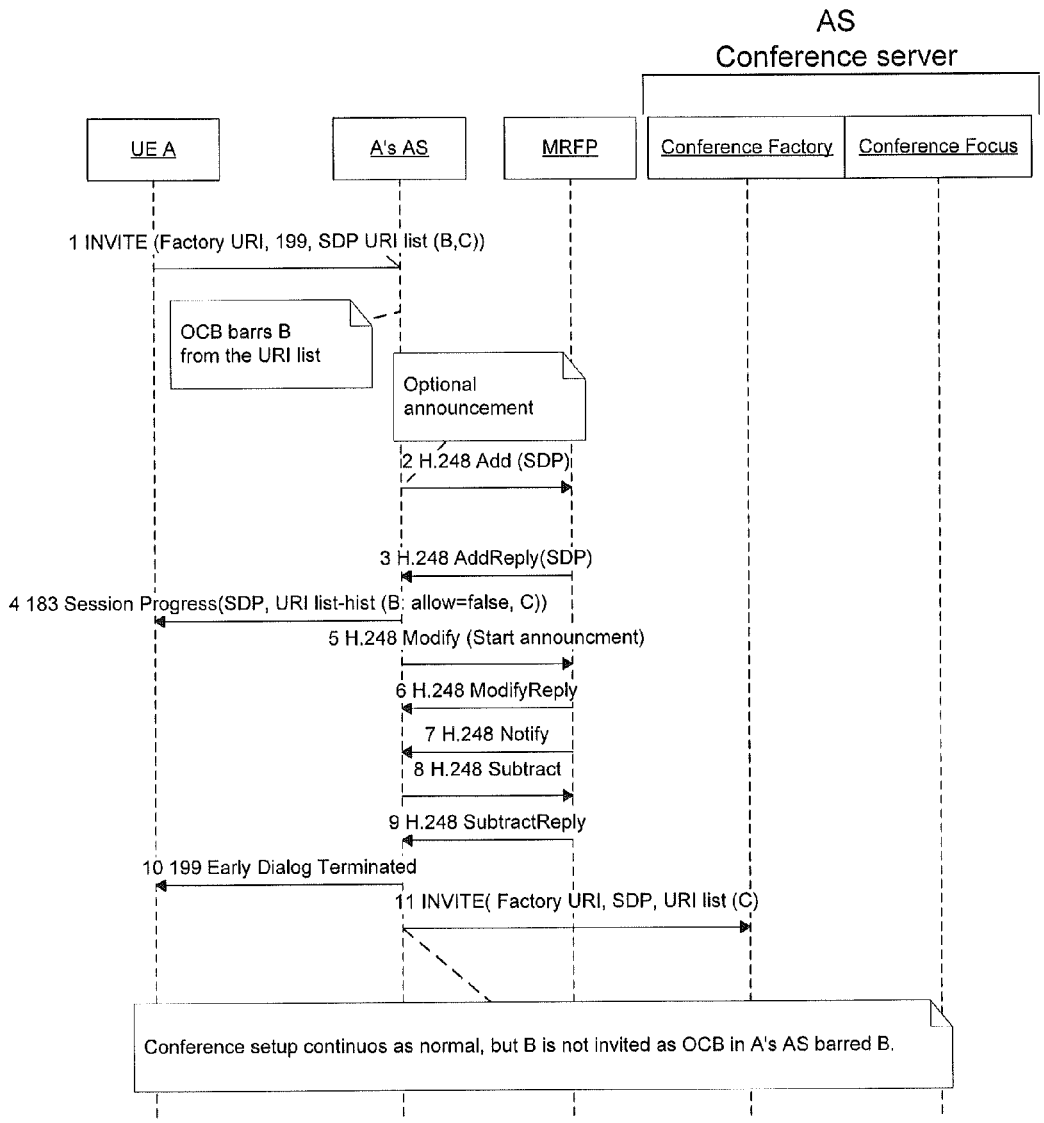
FIG. 3 illustrates a signalling flow associated with the creation of an IMS conference involving three parties, A, B and C, and where an Outgoing Communication Barring service bars user B from the conference.

The IMS is able to make use of the SIP 183 Session Progress message to allow intermediate progress reports to be sent to IMS users. A conventional use of the 183 Session Progress message is to send back an SDP answer to an offered SDP in an initial INVITE in case the INVITE is not answered immediately with a 200 OK. The 183 Session Progress message provides an ideal vehicle for sending OCB related information to a conference creator, e.g. by including within a 183 Session Progress message a URI list of the barred identities and optionally an SDP for an announcement. FIG. 3 illustrates signalling associated with this approach, where an OCB service for a user A, implemented by "A's (MT) AS", bars a user B from being included in a conference. Message 4 in the signalling flow is a SIP 183 session Progress message which includes an indication that, whilst the conference set up will proceed in respect of peer user C, peer user B is barred by the OCB service and will therefore not be invited to join the conference. Messages 2 and 3 in the flow are optionally used to obtain an SDP part corresponding to an announcement informing the user of the OCB service decision (A's AS can include the identity of B in the H.248 message sent to the MRFC). This optional SDP part is included in the 183 message sent to user A. Upon receipt of the 183 message, UE A processes the message content according to rules predefined within IMS client. The result may be the display of a message indicating that user B is barred and/or the playing of an announcement according to the SDP contained in the 183 message, where messages 5 to 10 in the flow of FIG. 3 relate to the ordering of the announcement by the AS and where the SDP part included in the 183 Session Progress includes the IP address and port number where UE A should listen for the announcement and also an identification of the used codec.

At step 11, the modified INVITE with the reduced URI list, i.e. including only the URI or peer user C, is sent from A's AS to the conference server. The conference set up procedure continues according to the 3GPP TS 24.147.

It is noted that, in order to ensure reliable delivery of the 183 Session Progress message, the INVITE may contain 100rel in the Supported header, the 183 Session Progress may contain a 100rel indication in the Require header. In this case, the flow includes also the PRACK (Provisional Response ACKnowledgement) and 200 OK (PRACK) messages.

Considering further the OCB service indication included within the 183 Session Progress message, this may be enabled by providing an extension to the XML resource list [RFC4826], see http://www.rfc-editor.org/rfc/rfc4826.txt. According to RFC4826, each <list> element is composed of 1) an optional display name, 2) a sequence of zero or more elements each of which may be an <entry> element, a <list> element, an <entry-refs> element, or an <external> element, followed by 3) any number of elements from other namespaces for the purposes of extensibility. The option for a <list> element to contain other <list> elements means that a resource list can be hierarchically structured.

An extension to the XML resource list [RFC4826] is proposed here in order to include a result of the OCB service invocation for each URI entry, and includes the usage of the extended XML resource list in the 183 Session Progress. This may be achieved by means of a new RFC. As already discussed, the 183 Session Progress is itself sent to the conference creator to inform the creator of an identity or identities in the URI list that have been barred. The schema of the extension attribute to the XML resource list is as follows:

```
<?xml version="1.0" encoding="UTF-8"?>
<xs:schema targetNamespace="urn:ietf:params:xml:ns:rl-allow"
    xmlns="urn:ietf:params:xml:ns:rl-allow"
    xmlns:rls="urn:ietf:params:xml:ns:resource-lists"
    xmlns:xs="http://www.w3.org/2001/XMLSchema"
    elementFormDefault="qualified"
    attributeFormDefault="unqualified">
  <xs:annotation>
    <xs:documentation xml:lang="en">
      Adds the allow attribute to URIs included in a resource list.
    </xs:documentation>
  </xs:annotation>
  <xs:import namespace="urn:ietf:params:xml:ns:resource-lists"
      schemaLocation="urn:ietf:params:xml:schema:resource-lists"/>
  <xs:attribute name="allow" type="xs:boolean" use="optional"
      default="true"/>
</xs:schema>
```

Applying this extension to an example in which a user (A) invites three peer users Bill, Randy, and Eddy to a conference call and A's OCB service bars both Randy and Eddy, the XML multipart body that is included within the 183 Session Progress message is as follows:

```
--boundary1
    Content-Type: application/resource-lists+xml
    Content-Disposition: recipient-list-history;handling=optional
    <?xml version="1.0" encoding="UTF-8"?>
    <resource-lists xmlns="urn:ietf:params:xml:ns:resource-lists"
            xmlns:cp="urn:ietf:params:xml:ns:rl-allow">
        <list>
            <entry uri="sip:bill@example.com" cp:allow="true" />
            <entry uri="sip:randy@example.net" cp:allow="false"/>
            <entry uri="sip:eddy@example.com" cp:allow="false" />
        </list>
    </resource-lists>
    --boundary1—
```

It may be advantageous to extend the existing RFC further in order to allow additional information to be included within the XML multipart body to provide additional information to the conference creator. A suitable schema may be as follows:

```
<?xml version="1.0" encoding="UTF-8"?>
<xs:schema targetNamespace="urn:ietf:params:xml:ns:rl-allow"
xmlns="urn:ietf:params:xml:ns:rl-allow"
xmlns:rls="urn:ietf:params:xml:ns:resource-lists"
xmlns:xs="http://www.w3.org/2001/XMLSchema"
elementFormDefault="qualified" attributeFormDefault="unqualified">
<xs:annotation>
   <xs:documentation xml:lang="en">
     Adds the allow attribute to URIs included in a resource list.
   </xs:documentation>
</xs:annotation>
<xs:import namespace="urn:ietf:params:xml:ns:resource-lists"
       schemaLocation="urn:ietf:params:xml:schema:resource-lists"/>
<xs:attribute name="allow" type="xs:boolean" default="true"/>
<xs:attribute name="reason">
   <xs:simpleType>
     <xs:restriction base="xs:string">
       <xs:enumeration value="not_subscribed"/>
       <xs:enumeration value="user_rule"/>
       <xs:enumeration value="wrong_URI_format"/>
       <xs:enumeration value="reserved_URI"/>
     </xs:restriction>
   </xs:simpleType>
</xs:attribute>
<xs:attribute name="cause">
   <xs:simpleType>
     <xs:restriction base="xs:string">
```

-continued

```
        <xs:enumeration value="location_of_origin"/>
        <xs:enumeration value="carrier"/>
        <xs:enumeration value="time"/>
      </xs:restriction>
    </xs:simpleType>
  </xs:attribute>
  <xs:attribute name="other_info">
    <xs:simpleType>
      <xs:restriction base="xs:string">
        <xs:maxLength value="32"/>
      </xs:restriction>
    </xs:simpleType>
  </xs:attribute>
</xs:schema>
```

Applying this schema to the above example will result in the following multipart XML body:

```
<<...>>
<rls:list>
    <rls:entry uri="sip:bill@example.com" cp:allow="true" />
    <rls:entry uri="sip:randy@example.net" cp:allow="false"
        cp:reason="not_subscribed" cp:cause="location_of_origin"/>
    <rls:entry uri="sip:eddy@example.com" cp:allow="false"
        cp:reason="user_rule" cp:other_info="my_barring_rule"/>
</rls:list>
```

Figure 4:
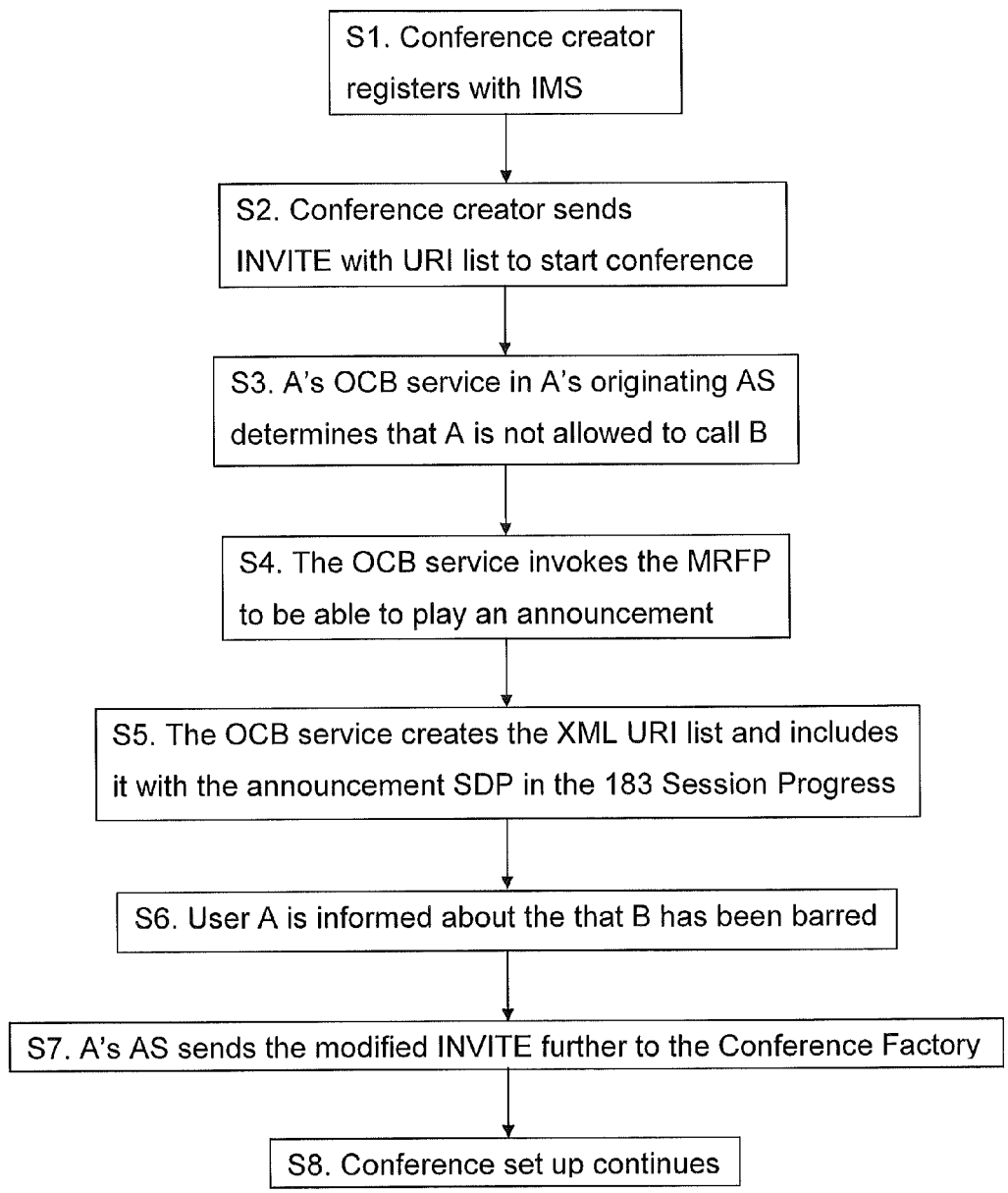
FIG. 4 is a flow diagram illustrating a procedure for notifying a conference creator of an Outgoing Communication Barring service invocation result.

FIG. 4 is a flow diagram illustrating the procedure for informing a conference creator, i.e. user A (UE A), of the operation of an OCB service. As a prerequisite, the conference creator (A) registers at step S1 with the IMS using the standard procedures. Registration will cause the user's Initial Filter Criteria (IFCs) to be loaded into the allocated S-CSCF. One of these IFCs will relate to the OCB service for the user. At step S2 user A sends an INVITE with a peer URI list in order to start a conference. The destination URI of the INVITE is that of the conference server. Upon receipt of the INVITE at user A's S-CSCF, the IFC for the OCB service will cause the INVITE to be routed to the A's AS. At step 3, upon receipt of the INVITE and according to this example, A's OCB service determines that A is not allowed to call B. At step S4, the OCB service invokes the MRFC in order to allow an announcement to be played.

Continuing the procedure, at step S5 The OCB service creates the XML URI list and includes it with the announcement SDP in the 183 Session Progress message. This message is sent to user A. At step S6, user A receives the 183 message and is notified that user B has been barred. At step S7, user A's AS forwards the modified INVITE to the conference factory and at step S8 the conference set up continues.

Figure 5:
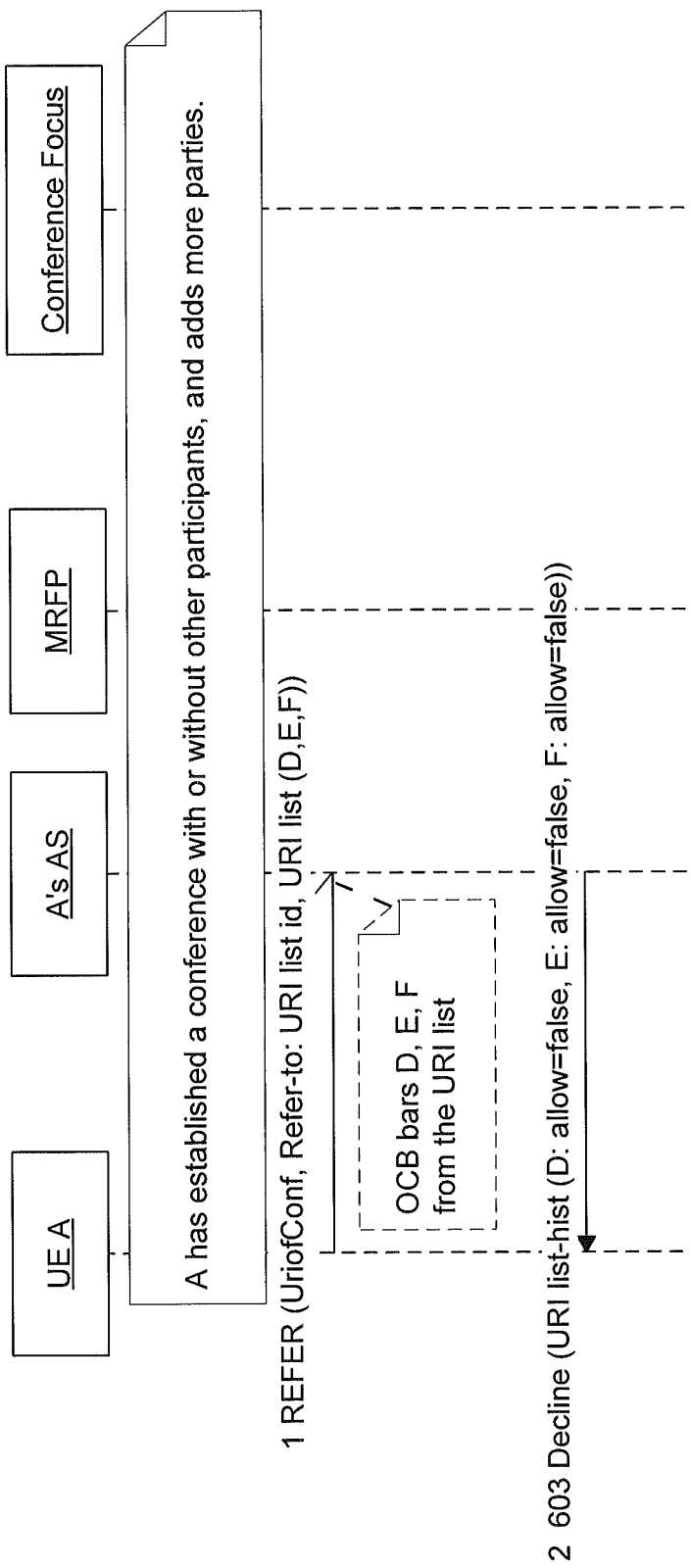
FIG. 5 illustrates a signalling flow in the case where an Outgoing Communication Barring service invocation bars all invitees to a conference.

FIG. 5 illustrates the case when additional participants are added to an existing conference with the REFER method, where the REFER message includes a URI list identifying one or more peer users being invited to join the conference. In this example, user A's OCB service determines that all of the invited users are barred. A's OCB does not forward the INVITE but rather sends a 603 Decline to user A. The 603 Decline includes an XML body as described above, indicating that all users have been barred by the OCB service.

Figure 6:
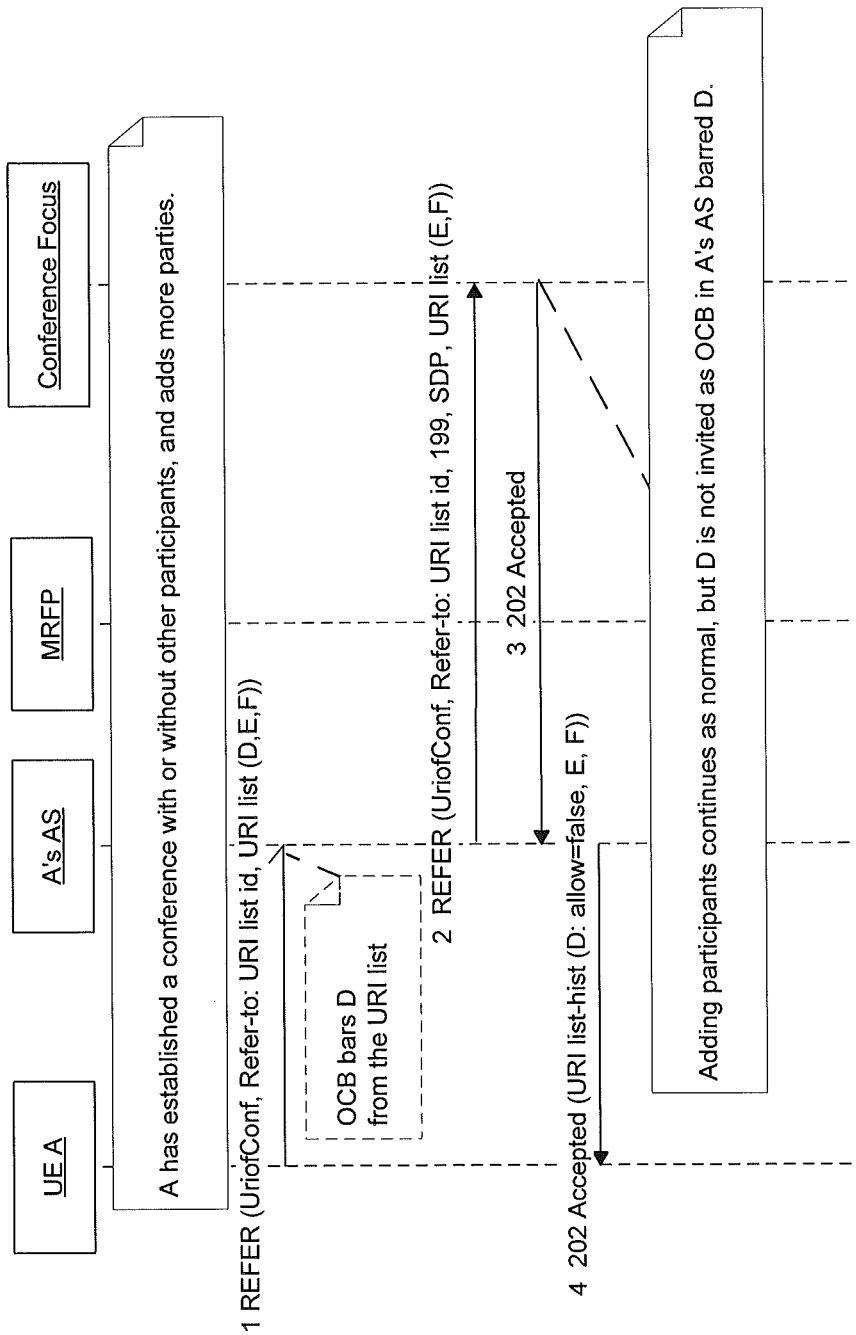
FIG. 6 illustrates a signalling flow in the case where an Outgoing Communication Barring service invocation bars a user D from a conference, and the result is reported to the conference creator using a 202 Accepted response.

FIG. 6 illustrates the case when additional participants are added to an existing conference with the REFER method, and only one of the additional users is barred by the OCB service in A's AS. In this case, the AS does not send a 603 Decline to user A. Rather, it forwards the modified INVITE, with user D's URI removed from the URI list, to the conference server. Upon receipt of the 202 accepted from the conference server, the AS includes within the message the XML body indicating that the OCB service has barred user D from the conference, before forwarding the 202 accepted to user A. This XML body is in line with that described above.

In the cases illustrated in FIGS. 5 and 6, no announcement is played to user A to indicate the OCB service decisions. Of course, this is possible and A's AS may include an SDP in the returned message (603 Decline or 202 Accepted) to achieve this.

Figure 7:
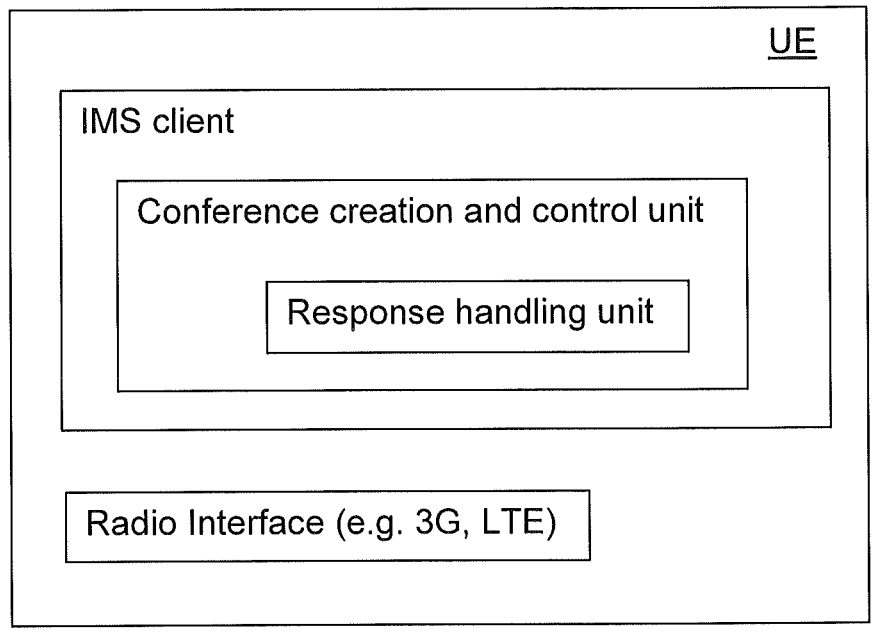
FIG. 7 illustrates schematically a user equipment (UE) including an IMS client adapted to handle an Outgoing Communication Barring result reported by the IMS network.

FIG. 7 illustrates schematically a user terminal or user equipment (UE) 1 adapted to implement the procedures described above. It will be appreciated that the UE will comprise appropriate hardware and software (with programming instructions and data) including a display to display information to a user. In order to interoperate with the IMS network, the UE 1 comprises an IMS client 2, which in turn provides a conference creation and control unit 3 which allows a user to initiate and control IMS (voice and multimedia) conferences with two or more further participants. Within the conference creation and control unit 3, a response handling unit 4 is provided. The purpose of the response handling unit is to process a SIP 183 Session Progress received from the OCB service AS, and in particular to process an XML body pertaining to an OCB service invocation result. This handling may comprise displaying on the terminal's display an indication that one or more users have been barred from the conference. The response handling unit 4 may further handle an SDP part by establishing a connection to the IMS network and playing an audio announcement to the user. The UE 1 further includes a standard 3G or LTE radio interface 5 for communicating with a radio access network of a cellular network.

Figure 8:
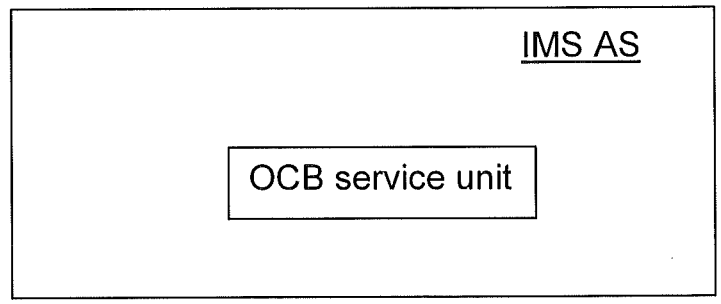
FIG. 8 illustrates schematically an IMS application server adapted to implement an Outgoing Communication Barring service on behalf of IMS users.

FIG. 8 illustrates schematically an IMS application server (AS) 10 such as might be used to implement the procedure described above within an IMS network. Again, it will be appreciated that the AS will comprise appropriate hardware and software (with programming instructions and data). In particular, the AS includes an OCB service unit 11 adapted to implement an OCB service on behalf of IMS users. This service includes reporting the result of an OCB service invocation to an IMS user, that is a conference creator, using one of the mechanisms described above, i.e. using the SIP 183 Session Progress, SIP 603 Decline, SIP 202 Accepted, or any other suitable SIP message. In particular, the OCB service unit 11 is adapted to construct the XML body containing the result, e.g. a URL list with decision and an SDP associated with an audio announcement. The OCB service unit 11 may be further adapted to contact a MRFC within the IMS network in order to configure the announcement and obtain the SDP part for inclusion in the response.

Figure 9:
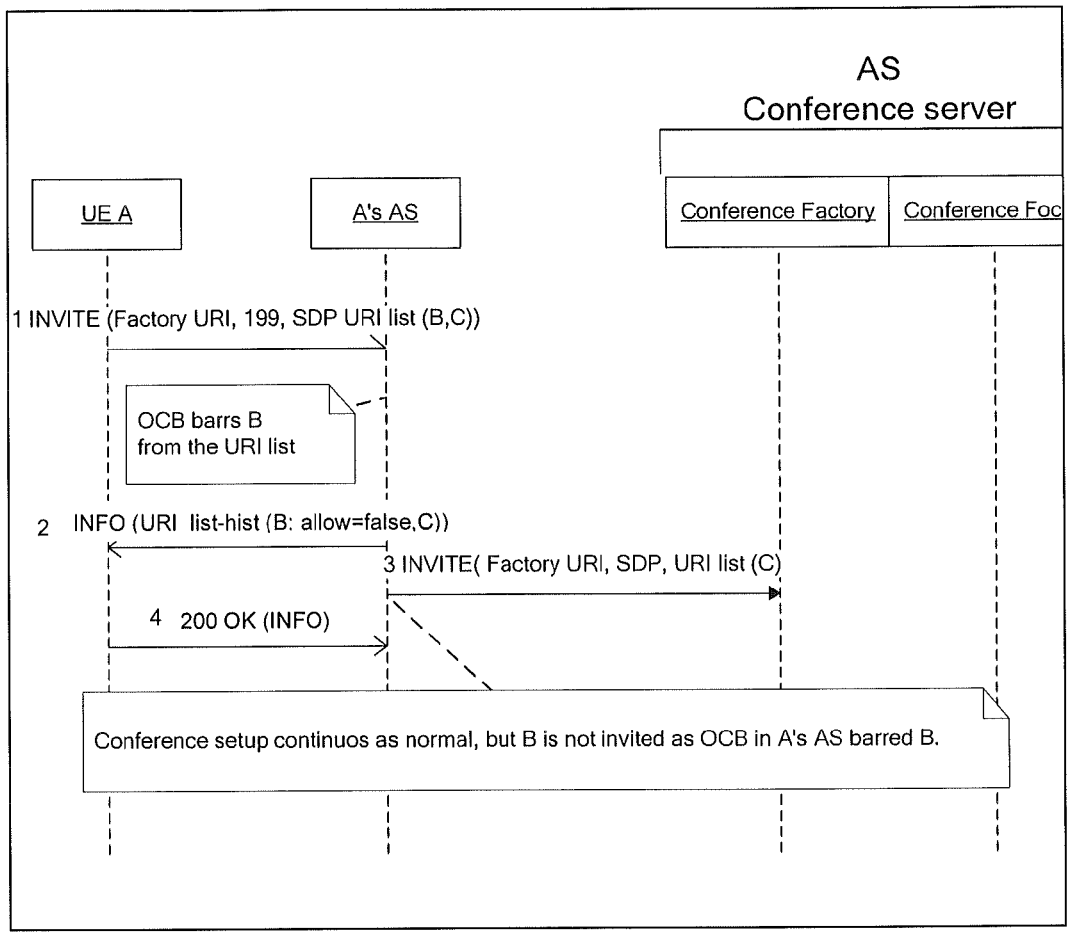
FIG. 9 illustrates a signalling flow in the case where a SIP INFO message is used to report an Outgoing Communication Barring result to a conference creator.

It will be appreciated by the person of skill in the art that various modifications may be made to the above described embodiments without departing from the scope of the present invention. FIG. 9 illustrates such an alternative implementation. This approach is similar to that illustrated in FIG. 3, except that a SIP INFO message is used to send the OCB service result to UE A. This approach is possible where there is no announcement to play to user A. Indeed, A's AS may choose to send the 183 Session Progress when there is an announcement to play, and a SIP INFO when there is no announcement to play.

Whilst the embodiments considered above have been presented in the context of a cellular radio access network, it will be appreciated that the invention is applicable to other access networks and terminals. For example, the user terminal may be a device having a WiFi or WiMax radio interface to a wireless access network, or it may be a fixed terminal having a cable access or the like.

In the above-description of various embodiments of the present invention, it is to be understood that the terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of this specification and the relevant art and will not be interpreted in an idealized or overly formal sense expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks.

A tangible, non-transitory computer-readable medium may include an electronic, magnetic, optical, electromagnetic, or semiconductor data storage system, apparatus, or device. More specific examples of the computer-readable medium would include the following: a portable computer diskette, a random access memory (RAM) circuit, a read-only memory (ROM) circuit, an erasable programmable read-only memory (EPROM or Flash memory) circuit, a portable compact disc read-only memory (CD-ROM), and a portable digital video disc read-only memory (DVD/BlueRay).

The computer program instructions may also be loaded onto a computer and/or other programmable data processing apparatus to cause a series of operational steps to be performed on the computer and/or other programmable apparatus to produce a computer-implemented process such that the instructions which execute on the computer or other programmable apparatus provide steps for implementing the functions/acts specified in the block diagrams and/or flowchart block or blocks. Accordingly, embodiments of the present invention may be embodied in hardware and/or in software (including firmware, resident software, micro-code, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of the invention. Moreover, although some of the diagrams include arrows on communication paths to show a primary direction of communication, it is to be understood that communication may occur in the opposite direction to the depicted arrows.

Many different embodiments have been disclosed herein, in connection with the above description and the drawings. It will be understood that it would be unduly repetitious and obfuscating to literally describe and illustrate every combination and subcombination of these embodiments. Accordingly, the present specification, including the drawings, shall be construed to constitute a complete written description of various example combinations and subcombinations of embodiments and of the manner and process of making and using them, and shall support claims to any such combination or subcombination.

Many variations and modifications can be made to the embodiments without substantially departing from the principles of the present invention. All such variations and modifications are intended to be included herein within the scope of the present invention. Accordingly, the above disclosed subject matter is to be considered illustrative, and not restrictive, and the appended claims are intended to cover all such modifications, enhancements, and other embodiments. Thus, to the maximum extent allowed by law, the scope of the present invention is to be determined by the broadest permissible interpretation of the following claims and their equivalents, and shall not be restricted or limited by the foregoing detailed description.

The invention claimed is:

1. A user terminal comprising:
an IP Multimedia Subsystem, IMS, client configured to enable the terminal to communicate with an IMS network, the IMS client comprising,
a conference creation and control circuit configured to create and control an IMS conference involving one or more participants, participants being identified within a conference INVITE or REFER message by respective Uniform Resource Identifiers, URIs, within a URI list, the conference creation and control circuit comprising a response handling circuit configured to receive for from said IMS network, in response to the sending of an INVITE or REFER, a SIP response message including an XML body specifying an Outgoing Communication Barring, OCB, service invocation result and configured to present the specified result to a terminal user,
wherein the OCB service invocation result identifies one or more barred URIs from within the URI list.

2. A user terminal according to claim 1, said response handling circuit being configured to identify within a received response message a Session Description Protocol, SDP, part identifying an audio announcement to be played on the terminal, and to cause said audio announcement to be played.

3. A user terminal according to claim 1, wherein said SIP response message is one of a:
SIP 183 Session Progress;
SIP 603 Decline;
SIP 202 Accepted; and
SIP INFO.

4. Apparatus configured to operate as an Application Server within an IP Multimedia Subsystem, IMS, network, the apparatus comprising:
an Outgoing Communication Barring, OCB, service circuit configured to invoke an OCB service in respect of subscribed IMS users, the OCB service circuit being configured to receive an INVITE or REFER message relating to the establishment or control of a conference call, the INVITE or REFER message identifying one or more participants by way of Uniform Resource Identifiers, URIs, within a URI list, to determine an OCB service invocation result for the URI list, and to construct and send to the conference creator a SIP response message including an XML body specifying said OCB service invocation result,
wherein the OCB service invocation result identifies one or more barred URIs from within the URI list.

5. Apparatus according to claim 4, said OCB service circuit being configured to include within said SIP response message a Session Description Protocol, SDP, part specifying an audio announcement to be played to the conference creator.

6. Apparatus according to claim 5, the OCB service circuit being configured to inform a Media Resource Function Controller, MRFC, of the IMS network of the URI of any participant barred from the conference as a result of said OCB service invocation for the purpose of allowing the MRFC to construct an audio announcement.

7. Apparatus according to claim 4, wherein said SIP response message is one of a:
SIP 183 Session Progress;
SIP 603 Decline;
SIP 202 Accepted; and
SIP INFO.

8. Apparatus according to claim 4, wherein said OCB service invocation result identifies for each of the one or more barred URIs a reason why the respective URI is barred.

9. Apparatus according to claim 4, the apparatus further comprising:
a radio interface configured to enable the terminal to communicate with a cellular telecommunications network.

10. A method of handling an INVITE or REFER message at an Application server implementing an Outgoing Communication Barring, OCB, service for an IMS user, the method comprising:
receiving an INVITE or REFER message in respect of a conference call initiated by a conference creator, the message identifying one or more participants by way of Uniform Resource Identifiers, URIs, within a URI list;
invoking an OCB service for the conference creator and applying the service to the INVITE or REFER message to determine an OCB service invocation result for the URI list; and
constructing and sending to the conference creator a SIP response message including an XML body specifying said OCB service invocation result,
wherein the OCB service invocation result identifies one or more barred URIs from within the URI list.

11. A method according to claim 10, wherein said SIP response message is one of a:
SIP 183 Session Progress;
SIP 603 Decline;
SIP 202 Accepted; and
SIP INFO.

12. A method according to claim 10, wherein said OCB service invocation result identifies for each of the one or more barred URIs a reason why the respective URI is barred.

* * * * *